Feb. 22, 1966   R. D. SMITH   3,236,275
SCREW DRIVER WITH AN H-SHAPED DRAWING BIT
Filed Oct. 24, 1962
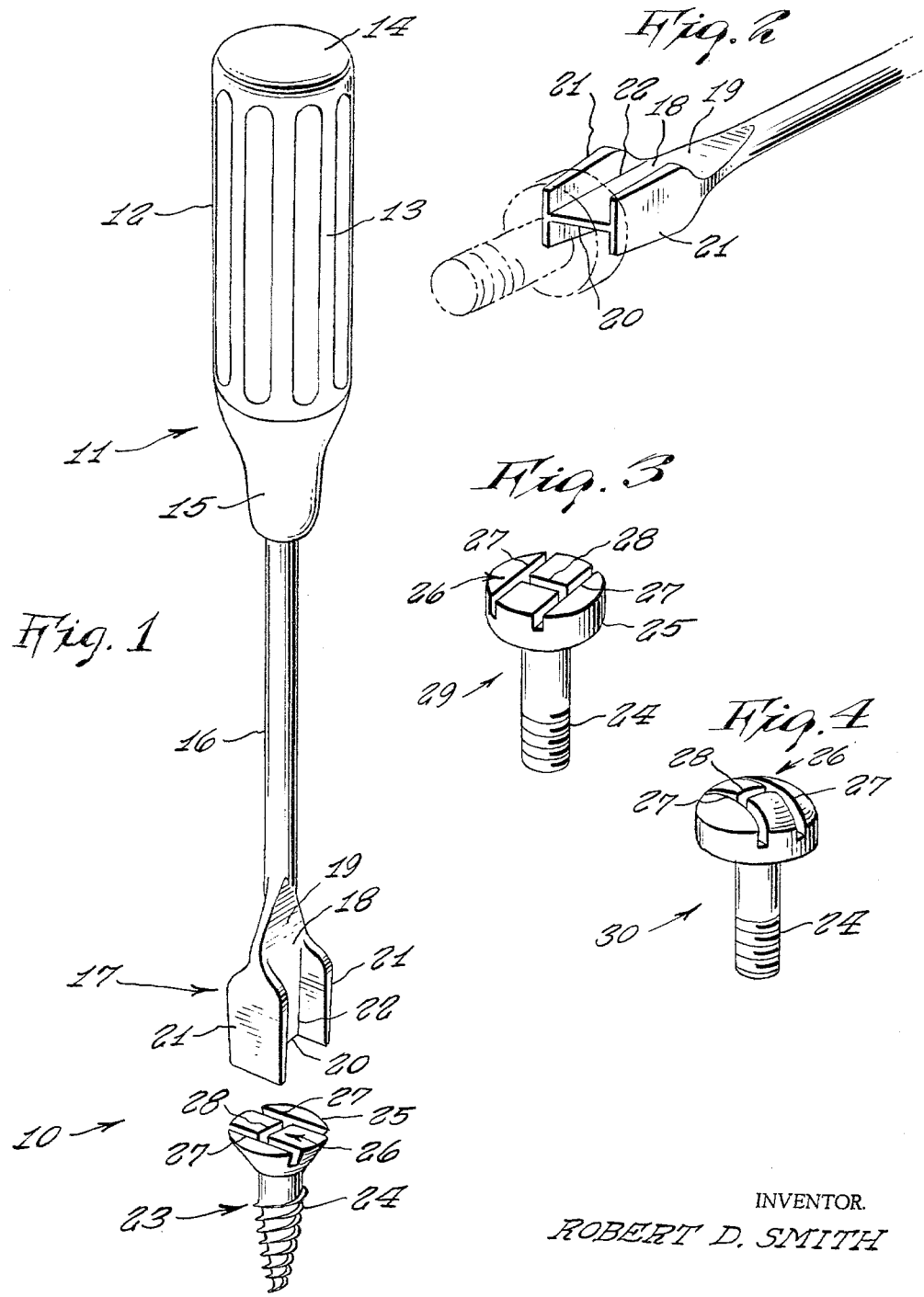
INVENTOR.
ROBERT D. SMITH

United States Patent Office 3,236,275
Patented Feb. 22, 1966

3,236,275
SCREW DRIVER WITH AN H-SHAPED
DRAWING BIT
Robert D. Smith, 2742 E. Tremont Ave., Bronx, N.Y.
Filed Oct. 24, 1962, Ser. No. 232,840
1 Claim. (Cl. 145—50)

This invention relates generally to screw driving tools and more specifically to screw drivers and associate screws.

One object of the present invention is to provide a screw driving tool having means to prevent slipping off from a screw head. It is generally well known to those skilled in the art that when a screw is being turned by a screw driver, it often happens that the screw driver slips out of the screw head slot. Sometimes it is difficult to again relocate the slot in order to re-engage the screw driver particularly when the screw is situated within a dark or hidden location.

Another object of the present invention is to provide a screw driver having magnetic means to hold a screw associated therewith. Thus a screw can be magnetically affixed to the screw driving tool and then lowered in a depending position downward into a threaded opening without the screw falling off of the tool. Thus the screw may be delivered into areas not accessible to a person's hand, and the screw need not be held by a person's fingers.

Another object of the invention is to provide a screw having a screw head slot that is adaptable to receive therein the above screw driver.

Other objects of the invention are to provide a screw driver having the above objects in mind which is of rugged construction, of simple design, has a minimum number of elements, is inexpensive to manufacture and efficient in operation.

For other objects of the present invention, reference may be had to the following detailed description taken in conjunction with the accompanying drawing in which:

FIGURE 1 is a perspective view of a screw driver and wood screw shown incorporating the present invention.

FIGURE 2 is a bottom perspective view of the screw driver and showing a screw, indicated in phantom lines, magnetically supported thereupon.

FIGURE 3 is a perspective view of a machine screw incorporating the invention; and FIGURE 4 is a perspective view of a modified type of screw incorporating the present invention.

Referring now to the drawing in more detail, the numeral 10 represents a screw driver and associate screw according to the present invention wherein there is a screw driver member 11 having a handle element 12 of generally longitudinal cylindrical configuration having a cylindrical side 13 and an upper end 14. Affixed to the lower end 15 thereof, there is the upper end of a longitudinally shank member 16 having a screw engaging element 17 at its lower end.

The screw engaging element is comprised of a plurality of blades disposed in an "H" arrangement when viewed from their lower edges, as shown in FIGURE 2 of the drawing.

A central blade 18 is formed by the downwardly converging opposite flat sides 19 of the lower end portion of the shank which terminate at a lower edge 20. At each opposite vertical edge of the blade 18 there is a transverse blade 21, each of the last said blades being parallel to each other and being integrally formed with the central blade forming vertical inside corners 22 there between. The screw engaging element is magnetized so as to securely hold a steel screw placed thereupon.

An associate screw 23 which forms a part of the present invention includes a threaded shank 24 and a head 25 having an "H" shaped screw driver slot 26. The slot is comprised of two parallel spaced apart slot elements 27 which are connected at their mid-portions by a transverse slot element 28.

As shown in FIGURES 3 and 4 this "H" shaped screw driver slot can be applied to any type of screw or screw head. In FIGURE 1 the screw illustrated is a countersunk head wood screw, whereas FIGURE 3 shows a flat head machine screw 29 and FIGURE 4 shows an oval head machine screw 30.

In operative use, a screw magnetically affixed to the screw engaging element of the screw driver and then turned in a threaded opening in a conventional manner, without danger of the screw driver slipping out of the slot due to the "H" shaped engaging parts.

It is to be noted that the screw head will not shear off or become ragged. The screw will move easily. It will turn several times as easy as conventional screws.

While various changes may be made in the detail construction, it shall be understood that such changes shall be within the spirit and scope of the present invention as defined by the appended claim.

What I claim as new and desire to protect by Letters Patent of the United States is:

In a screw driver for screws or bolts the combination of a member having a handle at one end, a longitudinal shank, one end of said shank being affixed to said handle, the opposite end of said shank forming a screw engaging element having "H" shaped screw engaging means comprising a plurality of flat blades of rectangular transverse cross sectional configuration, one of said blades forming a central blade and the other two of said blades being disposed transverse at 90 degrees to said central blade and in parallel spaced apart relation, one end edge of said central blade being in integral abutment with the mid-portion of one side of each of said other blades forming said "H" shaped screw engaging means, and the outer edge of said blades forming a singular continuous flat "H" shaped face with each blade having parallel straight opposite edges with each of said blades being relatively equal in length.

References Cited by the Examiner

UNITED STATES PATENTS

| 379,200 | 3/1888 | Hanlon | 85—45 |
| 697,836 | 4/1902 | Gorham. | |
| 755,804 | 3/1904 | Smith | 85—45 |
| 847,774 | 3/1907 | Hoffman. | |
| 1,490,775 | 4/1924 | Hemmerly. | |
| 2,397,216 | 3/1946 | Stellin | 85—45 |
| 2,800,936 | 7/1957 | West. | |

FOREIGN PATENTS

| 182,174 | 3/1907 | Germany. |

WILLIAM FELDMAN, Primary Examiner.

MILTON S. MEHR, ALBERT H. KAMPE, Examiners.